United States Patent [19]

Helgeland

[11] Patent Number: 4,662,797
[45] Date of Patent: May 5, 1987

[54] ADAPTABLE HOUSING FOR A VIDEO TERMINAL

[75] Inventor: Olav Helgeland, Nittedal, Norway

[73] Assignee: Hermann Hemscheidt Maschinenfabrik GmbH & Co., Wuppertal, Fed. Rep. of Germany

[21] Appl. No.: 698,859

[22] Filed: Feb. 6, 1985

[30] Foreign Application Priority Data

Feb. 14, 1984 [DE] Fed. Rep. of Germany ....... 3405223

[51] Int. Cl.$^4$ .................. H04N 5/64; H04N 5/645; H04N 5/655
[52] U.S. Cl. .................................. 358/254; 358/248; 358/249; 358/168
[58] Field of Search ............... 358/254, 248, 249, 168; 248/D 12; 312/7.2

[56] References Cited

U.S. PATENT DOCUMENTS

| 2,851,679 | 9/1958 | Wayne | 358/248 |
| 3,105,110 | 9/1963 | Kitamura | 358/254 |
| 3,164,673 | 1/1965 | Sharon | 358/168 |
| 3,251,939 | 5/1966 | Pestka | 358/254 |
| 3,573,366 | 4/1971 | Joseph | 358/254 |
| 4,167,757 | 9/1979 | Kono et al. | 358/254 |
| 4,267,555 | 5/1981 | Boyd et al. | 340/748 |
| 4,395,010 | 7/1983 | Helgeland et al. | 248/371 |
| 4,542,377 | 9/1985 | Hagen et al. | 358/254 |

Primary Examiner—Howard W. Britton
Assistant Examiner—John K. Peng
Attorney, Agent, or Firm—Berman, Aisenberg & Platt

[57] ABSTRACT

A video terminal has a housing composed of a basic housing encompassing a back portion of a picture tube and a frame encompassing a picture area of the tube. The basic housing is uniformly designed for a plurality of picture tubes of different sizes and variously designed frames are adapted to the basic housing in accordance with a respective picture tube. The frames are preferably secured to support mounts fixed to the frame which are disposed in said basic housing. Given an axially symmetrical design of said support mounts, the frame with said picture tube is optionally insertable either horizontally or vertically. The frame can be formed of one or more parts. The parts of the frame and/or of the frames and the basic housing can be connected to one another by snap-in closures.

19 Claims, 9 Drawing Figures

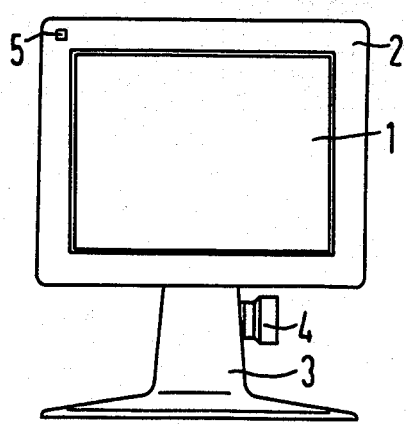
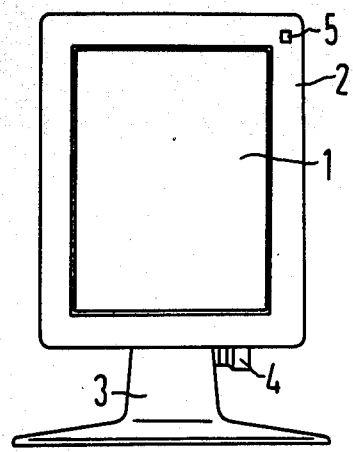
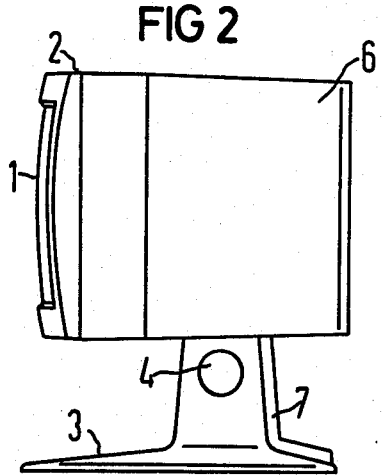
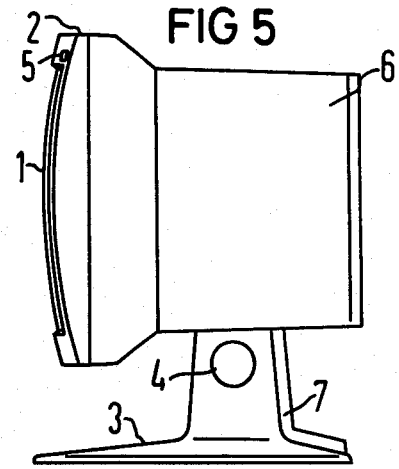
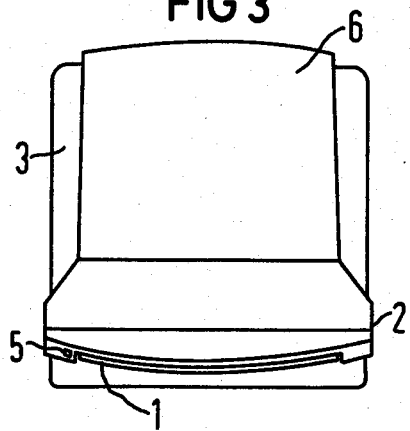
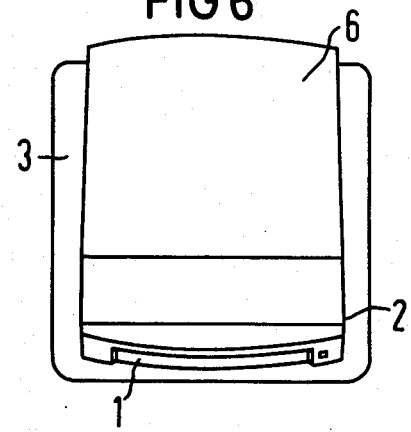

ADAPTABLE HOUSING FOR A VIDEO TERMINAL

BACKGROUND OF THE INVENTION

The invention relates to a video terminal in which a picture tube is provided in a housing which surrounds the picture tube, and wherein the housing has electronics mounted therein associated with the picture tube.

Video terminals are already known wherein a picture tube usually designed as a cathode ray tube is accommodated in a housing. For example, German No. OS 30 36 852, corresponding to U.S. Pat. No. 4,395,010, incorporated herein by reference, discloses a video terminal wherein the housing is composed of two parts. A basic housing surrounds the back part of the picture tube and a frame encompasses the actual picture area and is connected to the basic housing. Given this known video terminal, the basic housing is positioned on a variable-height pedestal. It is also possible to position such housings on a cuboid control unit which can also contain memory units such as, for example, diskette stores in addition to electronic modules.

It is generally known to employ video terminals having picture tubes of different sizes. For example, picture screen diagonals of 12 inches to 17 inches are conventional for the representation of texts. Furthermore, black/white and color representations are conventional, whereby the picture tubes have a different length and/or different shape given the same picture area. The housings of the video terminals are adapted to the respective picture tubes, so that the basic housing and the frame are variously designed both with respect to shape as well as with respect to their size. The production of such video terminals requires a relatively great expense since the various housings must be manufactured for the different picture tubes, and thus different tools are required for manufacture. Warehousing is also relatively involved since a plurality of different housings must be kept on hand.

SUMMARY OF THE INVENTION

It is an object of the invention to specify a video terminal which has a substantially less expense for housing manufacture and warehousing.

Given the video terminal of the type initially cited, this object is achieved in accordance with the invention by forming the housing with a basic housing and a frame connected to the basic housing. The basic housing surrounds the back part of the picture tube, and the frame surrounds a picture area of the picture tube. Support mounting means are provided in the basic housing for connecting different frames to the basic housing corresponding to the respective picture tube to be employed as desired without changing said basic housing.

The video terminal of the invention has the advantage that it can be most-favorably manufactured since the basic housing is uniformly designed and can be manufactured with one tool despite the employment of different picture tubes. The picture tubes are already placed in position and adjusted in the various frames during production. Depending upon customer wishes, different frames having corresponding picture tubes can then be inserted into the basic housing. Bottom plates which contain electrical and/or electronic components are provided in the basic housing. It is particularly expedient to incorporate those components in all basic housings which are uniform for all video terminals, and to then employ adaptation units in accordance with the respectively employed picture tubes.

It is particularly expedient to design the support mounts in or at the basic housing in axial symmetrical fashion so that the picture tubes and the frames can be horizontally or vertically built in.

The support mounts can form a unit with the basic housing. However, it proves advantageous to attach the support mounts to base or wall plates of the video terminal which are disposed within the basic housing. The support mounts are designed axially symmetric for a horizontal and vertical introduction of the picture tubes. The support mounts are then expediently disposed on the contours of a square or of a circle.

Given a preferred embodiment, the basic housing is designed cup-like and at least partially encompasses the support mounts. Preferably, this basic housing also has a quadratic or rectangular cross-section or is designed in cuboid fashion.

The picture tube can be secured to the basic housing. Preferably, however, it is secured to the frame and is both mechanically as well as electronically adjusted before being built in. The frame itself can preferably be designed of one-piece construction given small picture screen diagonals and preferably in multi-part fashion given larger picture screen diagonals. The individual parts of the frame can thus be screwed to one another or can be connected to one another upon employment of a snap closure for cost reasons. The analogous situation applies to the fastening of the frame to the support mount.

BRIEF DESCRIPTION OF THE DRAWINGS

FIG. 1 is a front view of a first video terminal;
FIG. 2 is a side view of the first video terminal;
FIG. 3 is a plan view of the first video terminal;
FIG. 4 is a front view of a second video terminal;
FIG. 5 is a side view of the second video terminal;
FIG. 6 is a plan view of the second video terminal.

DESCRIPTION OF THE PREFERRED EMBODIMENTS

Figure 7:
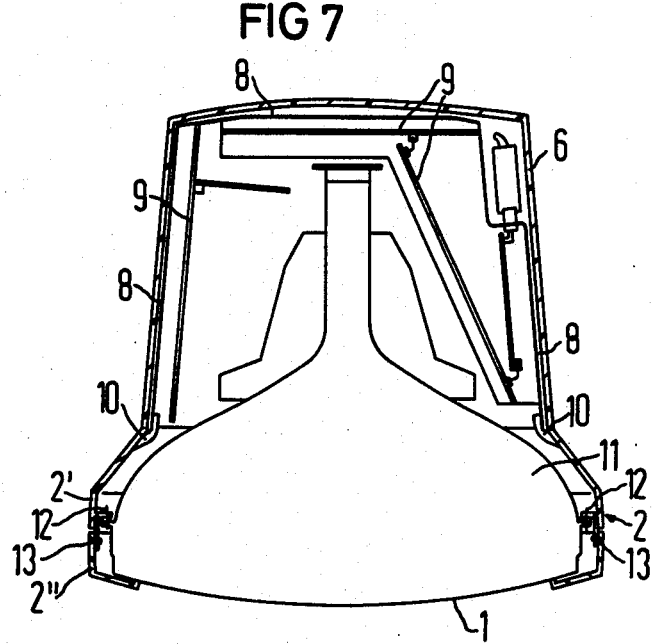
FIG. 7 is a cross-section through the first video terminal.

Given the video terminal illustrated in FIG. 1, a picture tube having a picture area 1 is disposed in a housing of which only a frame 2 surrounding the picture area 1 is shown in the illustrated front view. The housing is positioned on a pedestal 3 which can be designed such that the housing is adjustable in height by means of a twist grip 4. Furthermore, the housing can be secured on the pedestal 3 so as to be rotatable and/or inclinable. An opening can be provided in the frame 2 in the upper left or right corner, a light-sensitive element 5 being situated behind the opening which enables an adaptation of the brightness of the representation on the picture area 1 to the respective ambient brightness.

The side view of the video terminal shown in FIG. 2 shows a basic housing 6 which encompasses the back part of the picture tube and, for example, is designed in cup-like or cuboid fashion and which is slipped from behind over the back part of the picture tube and base plates with electric components contained in the housing. The frame 2 embracing the picture area 1 of the picture tube is designed in bipartite fashion in the illustrative embodiment shown and is composed of a front frame part and of a frame part disposed between the front frame part and the basic housing 6.

The basic housing 6 is disposed on the pedestal 3. Situated at the backside of the pedestal 3 is a cover 7 which forms a cable channel for a power cable and for connecting cables between the video terminal and a control unit and/or a keyboard.

The frame 2 can be directly connected to the basic housing 6 at a front rim thereof and, for example, can be screwed or snapped thereto. However, it proves expedient to provide support mounts in the basic housing 6 at the base plates. Depending upon the use, frames 2 of different sizes and having the corresponding picture tubes can then be inserted into these support mounts. The diagonals of the picture areas 1 of the picture screens amount, for example, to between twelve inches and seventeen inches, and the picture tubes can also be designed for a black/white presentation or for a multi-color presentation. The basic housing 6 remains the same in all events and various frames 2 which are matched to the respective picture tubes are merely inserted into the basic housing 6. It is also possible to incorporate the same frame 2 horizontally or vertically, so that, for example, a DIN A4 upright size can be provided at the picture area 1. In order to permit this type of incorporation, the support mounts are preferably designed to be axially symmetric, so that the differing incorporation of the frame 2 is possible in a simple fashion either at the manufacturer or at the customer.

The plan view of the video terminal illustrated in FIG. 3 again shows the basic housing 6 which likewise preferably comprises an axially symmetric cross-section at the opening toward the frame 2. This cross-section is preferably quadratic and it is also possible to design this cross-section in circular fashion.

Given the illustration in FIGS. 1 through 3, the picture tube and the frame 2 are horizontally built in. As a consequence of the rectangular design of the picture area 1, this results in the fact that the frame 2, as shown in FIG. 2, is designed approximately flush or in alignment with the basic housing 6 at the upper side and at the bottom side. As may be seen in FIG. 3, however, the frame with respect to the side walls of the basic housing 6 is designed in wedge-like or conical fashion in order to adapt the frame 2 to the basic housing with respect to shape.

In case small picture tubes are employed and the picture area 1 is not larger than the cross-section of the basic housing 6, the frame 2 can also be designed of one piece and, in this case, the picture area 1 does not project out of the basic housing 6 or only projects slightly therefrom.

Given the illustration in FIG. 4, the frame 2 and the picture tube having the picture area 1 are incorporated vertically into the basic housing 6, so that an upright representation at the picture area 1 is possible. In case the same frame 2 as in the video terminal shown in FIGS. 1 through 3 is employed, the integration of the frame 2 occurs such that the opening for the light-sensitive element 5 is again situated in an upper corner so that the ambient brightness can be optimally measured.

The side view of the video terminal shown in FIG. 5 shows that the same basic housing 6, the same pedestal 3 and, under given conditions, the same frame 2 are employed. Corresponding to the plan view shown in FIG. 3 given the horizontally integrated frame 2, the frame 2 now projects somewhat beyond the basic housing 6 at the upper side and at the underside thereof when the frame 2 is vertically built in.

Given the plan view of the video terminal illustrated in FIG. 6, it may be seen in contrast to the plan view shown in FIG. 3 that the frame 2 now does not laterally project beyond the basic housing 6 or projects only slightly therebeyond, as is likewise the case at the upper side and at the underside of the basic housing 6 given the horizontal incorporation shown in FIG. 2.

Given the section through the video terminal corresponding to FIGS. 1 through 3 shown in FIG. 7, base plates 8 are positioned at interior walls in the basic housing 6. These base plates 8 can, on the one hand, contain electrical components and, on the other hand, can be designed as support mounts for electronic modules 9. In addition, the support mounts 10 for fastening the various possible frames and for the horizontal or vertical incorporation of the frame 2 are provided at the bottom plates 8 in the proximity of the opening of the basic housing 6. When the video terminal is assembled, the picture tube 11 can be secured, for example, to the base plates 8 before the frame is fastened in the basic housing 6. Particularly given a bipartite design of the frame 2, however, it proves particularly expedient to first secure the picture tube 11 in the back frame part 2' by fastenings 12 and to then secure the picture tube in common with the back frame part 2' in the basic housing 6 at the base plates 8 by the support mounts 10. The front frame part 2'' can be secured to the back frame part 2' by means of a fastening 13 either subsequently or before the back frame part 2' is fastened to the picture tube 11.

Figure 8:
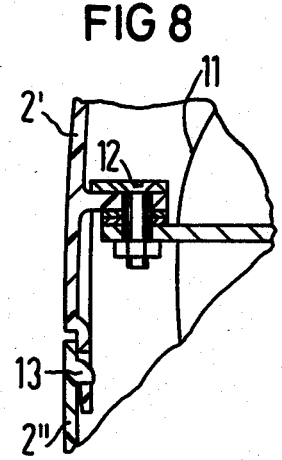
FIG. 8 is an enlarged excerpt from the cross-section of FIG. 7.
Figure 9:
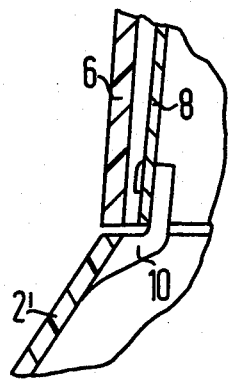
FIG. 9 is a further enlarged excerpt from the cross-section of FIG. 7.

The enlarged excerpt from FIG. 7 which is shown in FIG. 8 shows the fastening 12 by means of which the picture tube 11 is secured to the back frame part 2'. This fastening is expediently formed by screws positioned at the circumference of the picture tube 11, the picture tube 11 being screwed to inwardly directed parts of the back frame part 2' by these screws.

FIG. 8 also shows the fastening 13 by which the front frame part 2'' is connected to the back frame part 2'. This connection is designed, for example, as a positive connection, particularly as a snap-closure, whereby a part of the front frame part 2'' designed in hook-like fashion engages into a corresponding opening at a rib of the back frame part 2'

The fastening of the back frame part 2' to the base plates 8 by means of the support mount 10 is, for example, likewise designed as a positive connection and, in particular, as a snap-closure. For this purpose, the back frame part 2' comprises a hook-like projection which engages into a corresponding opening of the base plate 8. It would be conceivable to directly connect the back frame part 2' to the basic housing 6 by employment of the support mount 10. However, the connection to the base plate 8 has the advantage that it has greater stability since the base plates 8 consist of a metallic material, whereas the basic housing 6, just like the frame 2, consists of a plastic. There is thus the advantage that the basic housing 6 can be removed in a very simple fashion for maintenance purposes and the components and assemblies secured to the base plate 8 are then easily accessible.

The fastening by the support mount 10 is designed as a releasable fastening in order to be able to incorporate different frames 2 with picture tubes 11 in a simple manner at the manufacturing plant, at the customer, or in order to incorporate the existing frame 2 with the picture tube 11 pivoted by 90°. In case a frame 2 prepared at the manufacturer and a corresponding picture tube 11 are incorporated, this has the advantage that these are already both mechanically as well as electronically adjusted, and thus integration can occur in a simple fashion. Under given conditions, corresponding assemblies 9 can also be interchanged in a very simple fashion.

Instead of the pedestal 3, the housing can also be erected in some other fashion. For example, it can be mounted on a control unit which contains additional memory units such as, for example, disk drives, or it is also possible to secure the housing to a support mount which is designed as a boom and may be secured to a work table.

Although various minor changes and modifications might be proposed by those skilled in the art, it will be understood that I wish to include within the claims of the patent warranted hereon all such changes and modifications as reasonably come within my contribution to the art.

I claim as my invention:

1. A video terminal, comprising:
   a picture tube;
   a housing surrounding said picture tube;
   said housing comprising a basic housing surrounding a back part of said picture tube and a frame connected to said basic housing surrounding a picture area of said picture tube;
   principal television electronics for the video terminal being mounted in said basic housing; and
   support mounting means provided in said basic housing for connecting different frames to the basic housing corresponding to a respective picture tube to be employed as desired without changing said basic housing.

2. A video terminal according to claim 1 wherein said support mounting means permits securing a rectangular frame either horizontally or vertically.

3. A video terminal according to claim 1 wherein said support mounting means are positioned at base plates adjacent opposite walls of said video terminal.

4. A video terminal according to claim 1 wherein said support mounting means are positioned at a front rim portion of said basic housing where said basic housing mates with the frame.

5. A video terminal according to claim 1 wherein said support mounting means comprises a plurality of support mounts which are symmetrically arranged at a front rim portion of said basic housing.

6. A video terminal according to claim 1 wherein said basic housing has an axially symmetric cross-section.

7. A video terminal according to claim 1 wherein said basic housing is cubical and said different frames are securable to an open area at a front rim thereof.

8. A video terminal according to claim 1 wherein said picture tube is secured in said frame.

9. A video terminal according to claim 1 wherein said frame is of one piece integral construction.

10. A video terminal according to claim 1 wherein sais support mounting means comprise releasable connections.

11. A video terminal according to claim 1 wherein an opening for a light-sensitive element is disposed in an upper corner of said frame.

12. A video terminal, comprising:
    a picture tube;
    a housing surrounding said picture tube;
    said housing comprising a basic housing surrounding a back part of said picture tube and a frame connected to said basic housing surrounding a picture area of said picture tube;
    electronics associated with said picture tube mounted in said basic housing;
    support mounting means provided in said basic housing for connecting different frames to the basic housing corresponding to a respective picture tube to be empolyed as desired without changing said basic housing; and
    said frame comprising at least two mateable parts.

13. A video terminal according to claim 12 wherein the two parts of said frame are connected to one another by a snap-in closure.

14. A video terminal housing system for housing a variety of picture tube sizes and for accommodating a accommodating a rectangularly shaped picture tube either vertically or horizontally, comprising:
    a basic housing dimensioned to surround a back portion of all of the picture tubes of different dimensions desired to be employed with the housing;
    means in said basic housing for mounting principal television electronics for said video terminal;
    a frame whose dimensions vary in accordance with dimensions of the picture tube connected to the basic housing whose dimensions do not change dependent upon dimensions of the picture tube; and
    mounting means for connecting the various frames of different dimensions to the basic housing, said mounting means being standard for all of the desired different dimensioned frames.

15. A method for manufacturing a video terminal, comprising the steps of:
    providing a plurality of picture tubes of different dimensions;
    providing a basic housing having dimensions adapted to permit it to surround a back portion of a variety of picture tubes of different dimensions;
    providing a plurality of frames of different dimensions adapted to mate with respective ones of the plurality of picture tubes;
    selecting a frame and matching picture tube of desired dimensions;
    providing principal electronic assemblies for use in the video terminal; and
    providing the principal electronic assemblies in the basic housing and mating the selected picture tube and frame with the basic housing.

16. A method according to claim 15 wherein the picture tube is first mounted to the frame and the frame is then mounted to the basic housing.

17. A method according to claim 15 including the steps of providing a base plate in said basic housing, mounting the electronic assemblies to the base plate, and providing a support mounting connecting to the base plate to which the frame connects.

18. A method according to claim 17 including the step of providing the support mounts in symmetrical fashion, providing the frame rectangular, and mounting the frame either horizontally or vertically as desired without changing a location of the support mounts on the basic housing.

19. A method for manufacturing a video terminal, comprising the steps of:

providing a plurality of picture tubes of different dimensions;

providing a basic housing having dimensions adapted to permit it to surround a back portion of a variety of picture tubes of different dimensions;

providing a plurality of frames of different dimensions adapted to mate with respective ones of the plurality of picture tubes;

selecting a frame and matching picture tube of desired dimensions;

providing electronic assemblies for use in the video terminal;

mounting the electronic assemblies in the basic housing and mating the selected picture tube and frame with the basic housing; and providing the frame as a front part and a back part, providing a picture tube mounting on the back part of the frame, assembling the picture tube to the back part of the frame, and then connecting the front part of the frame to the back part of the frame.

* * * * *

UNITED STATES PATENT AND TRADEMARK OFFICE
CERTIFICATE OF CORRECTION

PATENT NO. : 4,662,797
DATED : May 5, 1987
INVENTOR(S) : Olav Helgeland

It is certified that error appears in the above—identified patent and that said Letters Patent is hereby corrected as shown below:

On the face of the patent, the Assignee (Item No. [73]) is identified as Hermann Hemscheidt Maschinenfabrik GmbH & Co., Wuppertal, Federal Republic of Germany. This should be corrected to state the correct Assignee as --Tandberg Data A/S, Oslo, Norway--.

Signed and Sealed this

Eleventh Day of August, 1987

Attest:

DONALD J. QUIGG

Attesting Officer

Commissioner of Patents and Trademarks